(12) United States Patent
d'Entrecasteaux

(10) Patent No.: US 7,751,079 B2
(45) Date of Patent: Jul. 6, 2010

(54) METHOD AND SYSTEM FOR MANAGING PRINT JOB FILES FOR A SHARED PRINTER

(75) Inventor: Daryl d'Entrecasteaux, Cabridgeshire (GB)

(73) Assignee: Xerox Corporation, Norwalk, CT (US)

( * ) Notice: Subject to any disclaimer, the term of this patent is extended or adjusted under 35 U.S.C. 154(b) by 1607 days.

(21) Appl. No.: 10/916,110

(22) Filed: Aug. 11, 2004

(65) Prior Publication Data

US 2006/0033958 A1 Feb. 16, 2006

(51) Int. Cl.
- G06K 15/00 (2006.01)
- G06F 3/12 (2006.01)
- G06F 3/00 (2006.01)
- G06F 13/38 (2006.01)

(52) U.S. Cl. .............. 358/1.16; 358/1.1; 358/1.2; 358/1.15; 710/54; 710/65

(58) Field of Classification Search .............. 358/1.1, 358/1.2, 1.15, 1.16; 710/54, 65
See application file for complete search history.

(56) References Cited

U.S. PATENT DOCUMENTS

| | | | |
|---|---|---|---|
| 5,280,615 A | 1/1994 | Church et al. | |
| 5,781,711 A | 7/1998 | Austin et al. | |
| 5,812,273 A | 9/1998 | Conley et al. | |
| 5,970,224 A | 10/1999 | Salgado et al. | |
| 6,020,973 A | 2/2000 | Levine et al. | |
| 6,151,131 A | 11/2000 | Pepin et al. | |
| 6,570,670 B1 | 5/2003 | Salgado et al. | |
| 6,672,212 B1 | 1/2004 | Ferlitsch | |
| 6,717,690 B1 | 4/2004 | Salgado et al. | |
| 2002/0063884 A1 | 5/2002 | Bhogal et al. | |
| 2003/0200234 A1 | 10/2003 | Koppich et al. | |
| 2004/0156072 A1* | 8/2004 | Bolloni | 358/1.15 |
| 2005/0162667 A1* | 7/2005 | Felix et al. | 358/1.1 |

* cited by examiner

*Primary Examiner*—Edward L Coles
*Assistant Examiner*—Thomas J Lett
(74) *Attorney, Agent, or Firm*—Maginot, Moore & Beck LLP

(57) ABSTRACT

A system and method enable a user to generate a single batch job ticket for a plurality of print job tickets. The system includes a print driver, a print job manager, and a print engine. The print driver enables a user to request generation of a collective job queue and to provide a plurality of job tickets for the job queue. The print job manager includes a collective job queue manager and a print job scheduler. The collective job queue manager collects job tickets for a job queue and generates a single batch job ticket for the print job scheduling table when the job queue is closed. The print job scheduler selects single batch job tickets in accordance with various criteria and releases the job segments to a print engine for contiguous printing of the job segments.

17 Claims, 5 Drawing Sheets

METHOD AND SYSTEM FOR MANAGING PRINT JOB FILES FOR A SHARED PRINTER

FIELD OF THE INVENTION

The present invention relates generally to print job management systems, and more particularly, to print job management systems for shared printers on a computer network.

BACKGROUND OF THE INVENTION

Computer communication networks enable multiple computers to communication with one another to facilitate the exchange of information and to increase productivity. These networks are also used to couple resources to the computers so that the resources are shared and thus, more efficiently used. For example, a printer is a commonly shared resource on a computer network. By communicating print jobs from multiple computers to a commonly shared printer for output, a number of advantages are gained. For one, each computer no longer requires its own dedicated printer for the output of documents. This reduction in the number of printers required to support multiple computers may represent a significant financial savings for an organization. Additionally, the expense of maintaining and providing supplies for printers is reduced because the sharing of printer resources reduces the number of printers that need to be maintained by the organization.

Another benefit of sharing a printer on a computer network is that the printer is used more efficiently. When a printer is not printing a document, it is drawing power for no apparent purpose other than to be ready for printing a document. By coupling multiple computers to a printer, the printer is likely to process more jobs than if it was only coupled to a single computer. Consequently, the printer produces more documents over its life than if it was coupled to one computer only.

Although there are significant benefits to the coupling of multiple computers to a shared resource, such as a printer, there are some drawbacks as well. For one, the users do not schedule their requests for use of the shared resource. As a result, a shared resource may receive requests for the resource at approximately the same time. In this situation, the shared resource requires a job manager or an access arbiter. An access arbiter may accept a request for use of the resource and thereafter signal to other requesters that the resource is busy until the current job being performed is finished or otherwise terminated. However, this type of access arbiter is not preferred as it places the burden of continuing to poll the resource for access on the requesting computer or its user.

In an effort to offload the scheduling of jobs at a shared resource, job managers have been developed for shared resources. These job managers may be computer programs that execute on a server for the computer network or they may execute in the controller of a shared resource. For example, a print job manager may execute on a server of a client/server network. However, peer-to-peer networks and other network requirements have led to the incorporation of a job manager within the print engine of a printer. The job manager, whether resident on a server or printer, receives print job tickets that are generated by the user devices on the computer network and places them in a queue. A job ticket is a data structure that identifies the user requesting the printer, the digital document to be printed, and the parameters for performing the print job, such as the paper size and other printing parameters. The management of the queue may be based on a number of factors including user priorities, the size of the job, and the order in which the print jobs are received.

Printer technology has continued to improve. For example, the time required for generating and outputting a document from a printer has been significantly reduced. This time reduction increases the throughput of a printer so the time that a job ticket spends in the queue is reduced. In some aspects, this increase in speed simplifies the management of the job queue for the print job manager. However, this improvement has adversely impacted users.

Specifically, a significant number of print job tickets are able to be performed in a first in, first out (FIFO) manner. Thus, multiple users may send multiple print job tickets to a shared printer and the job manager interleaves these print job tickets in the queue it manages. The job manager at the printer may be able to process all of the job tickets before the users arrive at the printer to collect their printed documents. Because the job manager interleaved the job tickets in the print job queue, the printer jobs are in the output tray of the printer in an interleaved order. Thus, users are required to sort through the entire output stack of a printer to look for each of the jobs sent to the printer. Furthermore, the user must remember the jobs sent to the printer so they are able to collect all of their jobs. Consequently, worker productivity is lost at the output tray of the printer as users gather to sort through the output documents multiple times and inquire from one another whether one user mistakenly took another user's document.

In some cases, one user does take another user's document and the requesting user, after becoming frustrated in looking for the missing job, must return to his or her computer and send another job ticket to the print job manager. This not only wastes the worker's time and resources, but it also is an inefficient use of the printer resources as the document must be printed a second time. The first document is typically discarded by the user that mistakenly obtained it or it is returned to the output area, where it is likely discarded because a second copy of the document was already obtained.

SUMMARY OF THE INVENTION

The present invention addresses the need for facilitating the recovery of print jobs at a print tray, as well as others, by providing a method for aggregating print job segments for a user and printing them as a single batch so the individual job segments are not interleaved with print job segments from other users. The method includes directing a plurality of print job segments for a single user to a collective job queue and releasing the collective job queue to a print engine for printing as a single print job. The request for a collective job queue and the sending of the print job segments to the collective job queue is done under user control through a user interface for a print driver. Thus, the user may determine whether segments to be printed from the user's network device are contiguously printed or may be interleaved with print segments from other network devices.

The method of the present invention may also include generating a single banner page for the single batch printing. The elimination of banner pages for each segment in a single batch printing further contributes to the efficiency of the printing process. A single batch job ticket is generated for a plurality of job segments that were stored for a collective job queue and the single batch tickets are stored in a print job scheduling table. The method includes selecting for release to a print engine one of the single batch tickets stored in the print job scheduling table. The single batch print job selection is performed using various criteria. For example, the number and size of the job segments collected in a queue may be used to select a single batch job ticket so that smaller single batch jobs are printed before larger single batch jobs. The selection may also include parameters such as the time spent waiting for release to enable larger single batches to be printed before smaller, but more recently, received single batch print jobs. Additional selection parameters may include prioritizing collective job queues for the same user so that the user is unable to monopolize the printer with multiple single batch printing jobs. For example, the first collective job queue for a user may be selected against other collective job queues on the parameters noted above. However, subsequent collective job queues opened before the first collected job queue is printed may be delayed from being processed for printing until the collective job queues for other users are printed.

The method of the present invention may also enable a user to release a job segment from a collective job queue with the result that all the job segments are released so they may be scheduled with other individual job segments for release to the print engine. This feature gives a user the ability to override the arbitration feature for collective job queues as long as the user is willing to accept the interleaving of the job tickets with other job segments. A user may decide to use this feature in response to viewing the print queues and seeing multiple collective job queues being filled. By releasing the user's collective job queue, the user's job segments may be processed before the collective job queues of others are released for a single batch printing.

The present invention also addresses the need for facilitating the recovery of print jobs at a print tray, as well as others, by providing a system for aggregating print job segments for a user and printing them as a single batch so the individual job segments are not interleaved with print job segments from other users. The system includes a print driver for directing a plurality of print job segments from a network device to a collective job queue and a print manager for releasing the collective job queue to a print engine for printing as a single batch print job. The print driver may be a component of a network device having a user interface. By inputting parameters through the user input, the user may initiate the generation of a collective job queue, generate job tickets for job segments, and close the collective job queue. Thus, the user may determine whether segments to be printed for the user's network device are processed and scheduled for a single batch printing or interleaved with print segments from other network devices.

The print manager of the present invention may include a collective job queue manager and a print job scheduler. The collective job manager stores the job tickets in the collective job queue and the associated digital documents for later release to the print engine of the printer. In response to a signal indicating the close of a collective job queue, the collective job manager generates a table entry for the closed collective job queue in the print job scheduling table. The print job scheduler scans the print job scheduling table and determines which entry is to be released to the print engine of the printer. The print job scheduling table includes entries for individual job tickets and for collective job queues. Using various criteria, such as the number and size of the job segments collected in a collective job queue, the print job scheduler may release smaller single batches to be printed before larger single batches so larger single batches do not block smaller single batches from accessing the printer. The print job scheduler may also use parameters such as time spent in queue to enable larger single batches to be printed before smaller, but more recently, received single batch print jobs. The time in queue parameter prevents a larger single batch from being held indefinitely. Additional parameters used by the print job scheduler may include prioritizing collective job queues for the same user so that the user is unable to monopolize the printer with multiple single batch printing jobs. The print job scheduler also determines when to release individual job tickets to the print engine of the printer. The criteria for these releases may be the same or similar to those used to schedule the release of collective job queues.

The print driver of the present invention may also enable a user to release a collective job queue so that the job segments may be interleaved with other print jobs being processed by the print engine. This feature gives a user the ability to override the scheduling for collective job queues as long as the user is willing to accept the interleaving of the job tickets in the collective job queue with other individual job segments. A user may decide to use this feature in response to viewing the print queues and seeing multiple collective job queues being filled. By releasing the user's collective job queue, the user's job segments may be processed before the collective job queues of others are released for a single batch printing.

The above described features and advantages, as well as others, will become more readily apparent to those of ordinary skill in the art by reference to the following detailed description and accompanying drawings.

DETAILED DESCRIPTION

Figure 1:
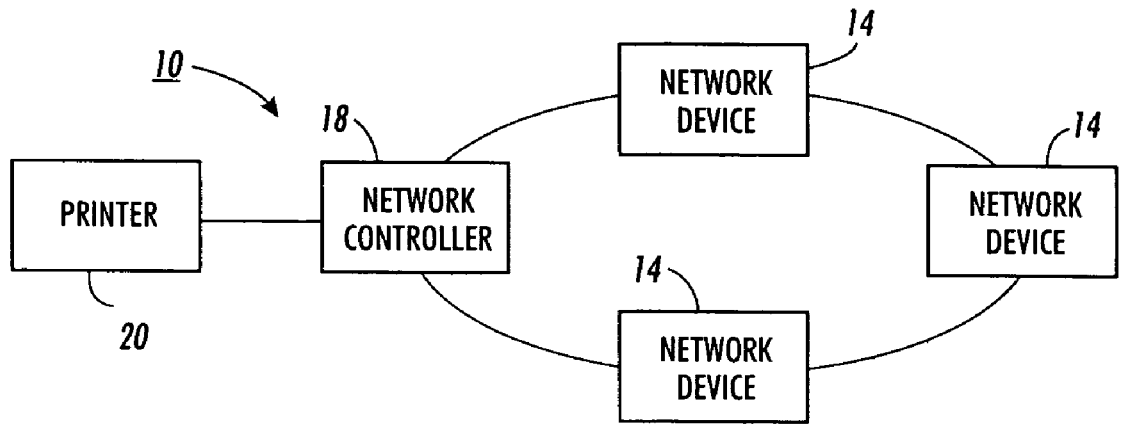
FIG. 1 shows a block diagram of a network in which the system and method of the present invention may be implemented.

FIG. 1 shows an example of a network 10 in which the principles of the present invention may be implemented. Network 10 includes network devices 14 and a network controller 18 that couples printer 20 to the network 10. The network devices 14 may be user devices that generate digital documents for printing on printer 20. Such devices include personal computers, document scanners, and the like. A document imaging device, such as a scanner, may also be coupled to the network 10 through a network device 14. The network devices 14 and the network controller 18 communicate in a peer-to-peer relationship.

Figure 2:
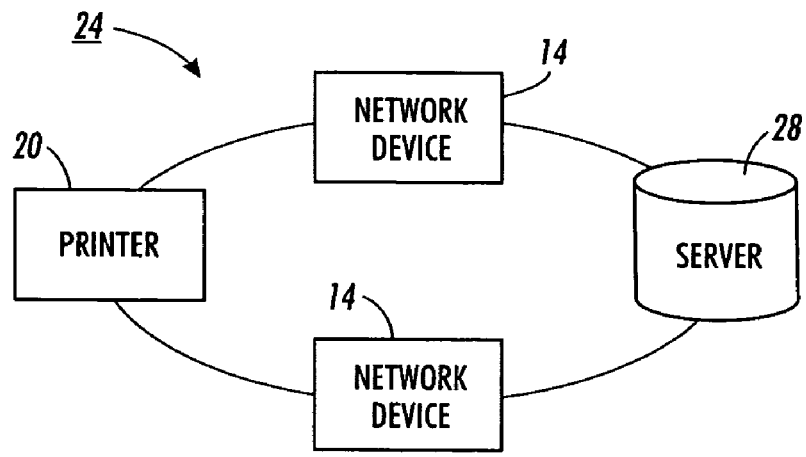
FIG. 2 shows a block diagram of another system in which the system and method of the present invention may be implemented.

Using like numerals to identify like components, another example of a network 24 in which the principles of the present invention may be implemented is shown in FIG. 2. The network 24 includes network devices 14, a server 28, and a printer 20. The server 28 performs the functions of the network controller 18 as well as those functions typically performed by a server in a server/client network. The network devices 14 and the printer 20 communicate with the server 28 in a server/client relationship. The server 20 may also be coupled to a common gateway interface for access to other networks and devices.

Figure 3:
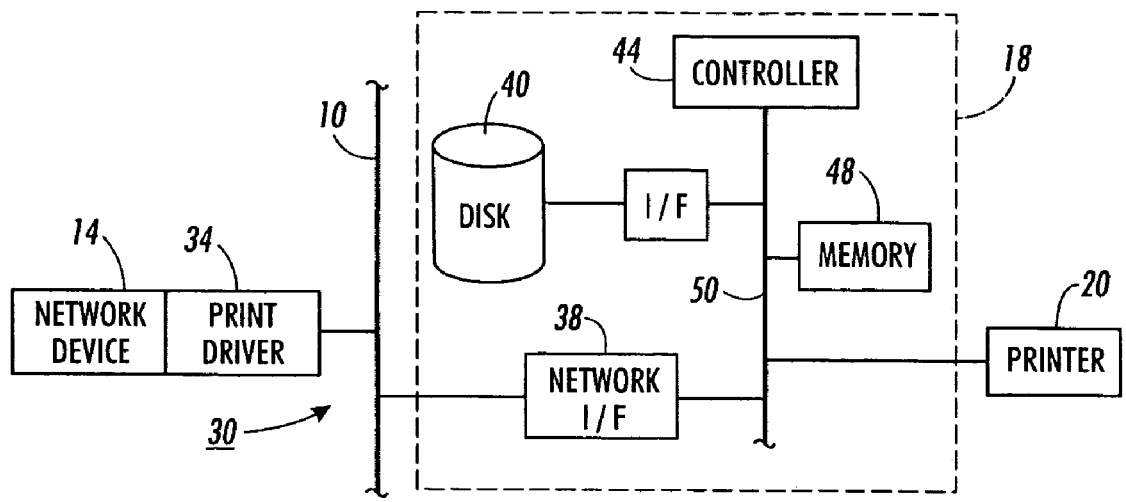
FIG. 3 is a block diagram of a system for enabling a user to collect job segments for printing in a single batch.

A system 30 that may be used to implement the principles of the present invention is shown in FIG. 3. The network device 14 of FIGS. 1 and 2 is shown in more detail to reveal a print driver 34. The print driver 34 is a computer program that executes on the network device 14. As discussed above, the network device may be a device having a processor with memory and a display as well known. The print driver includes instructions for providing a user interface that enables a user to define the digital documents to be printed and the parameters for printing the documents. These parameters include identification of the print stock on which the documents are to be printed, number of copies, and other related parameters as is well known. The identification of the digital document to be printed and the parameters for performing the printing are contained in a job ticket, which is generated by the printer driver 34. The generation of job tickets with print drivers is well known.

In accordance with the principles of the present invention, the print driver 34 may also be programmed so a user can specify a group of documents to be contiguously printed at a shared printer 20. To enable this specification, the print driver 34 may include a data object or other input method for receiving a user's instructions regarding a collective print job. An initial message is transmitted over a portion of the network 10 to the network controller 18. The components and functionality of the network controller discussed more fully below may also be included in the server 28 of the network 24.

Network controller 18 includes a network interface 38, a disk 40, a controller 44, and a memory 48 that are coupled together through an internal bus 50. The network controller 18 communicates with the print driver 34 to control the generation of the collective job queue for printing a single batch job. The controller 44 executes a print manager program stored in its memory 48 and/or disk 40 to perform its tasks for generating and managing collective job queues. The collection of job tickets in the collective job queue and the storage of digital documents on the network controller continue until the requesting network device sends an end of collective job queue message.

Figure 4:
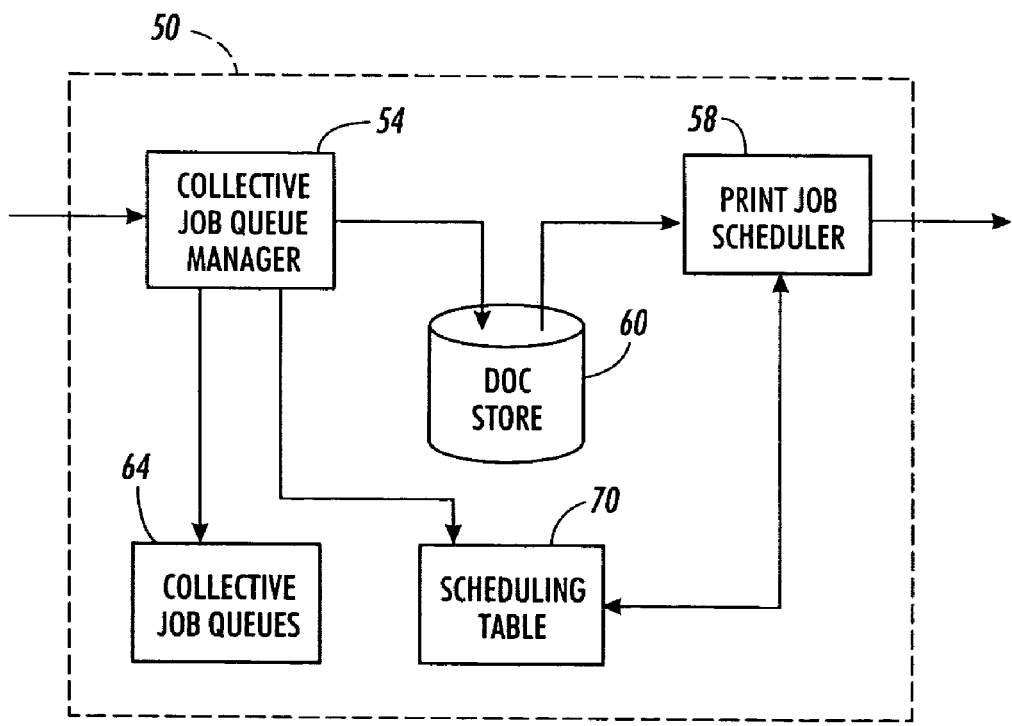
FIG. 4 is a block diagram of a program for managing a collective job queue and scheduling the release of job segments from a collective job queue.

An example of a print manager program executed by the network controller 18 is shown in FIG. 4. The print manager program 50 includes a collective job queue manager 54 and a print job scheduler 58. The collective job queue manager 54 generates a collective job queue that is associated with a requesting network device 14. The collective job queue may be generated on the disk 40 or in the memory 48 of the network controller 18. As job tickets and their corresponding digital documents are received from a network device 14, the collective job queue manager 54 determines whether a collective job queue has been generated for the network device identified by a job ticket. If a collective job queue is open for the network device, the network controller stores the job ticket in a collective job queue 64 and the associated digital document is stored in document storage 60 that may be maintained on disk 40 or in memory 48. A job ticket and its associated digital document comprise a job segment. The collective job queue manager 54 also includes pointers to the stored digital document with the job tickets stored in the collective job queue 64. When a close collective job queue message is received from a print driver 34, the collective job queue manager 54 closes the collective job queue and generates a single batch job ticket in the print job scheduling table 70.

The print job scheduler 58 of the print job manager 50 determines when a single batch job ticket for a closed collective job queue may be released to the print engine for printer 20 so the job segments corresponding to the single batch job ticket may be printed as a single batch job by the printer 20. The print job scheduler manages a table of individual print job tickets and single batch job tickets that are stored in the scheduling table 70 by the collective job queue manager 54. Job queue manager 54 may be used to store individual job tickets in the scheduling table 70 with pointers to their corresponding digital documents stored in document storage 60. The print job scheduler 58 parses the single batch job tickets to determine the number and size of the job segments corresponding to the single batch job ticket. These data are used to determine when to release a single batch job ticket and its associated documents to the printer 20.

Figure 5:
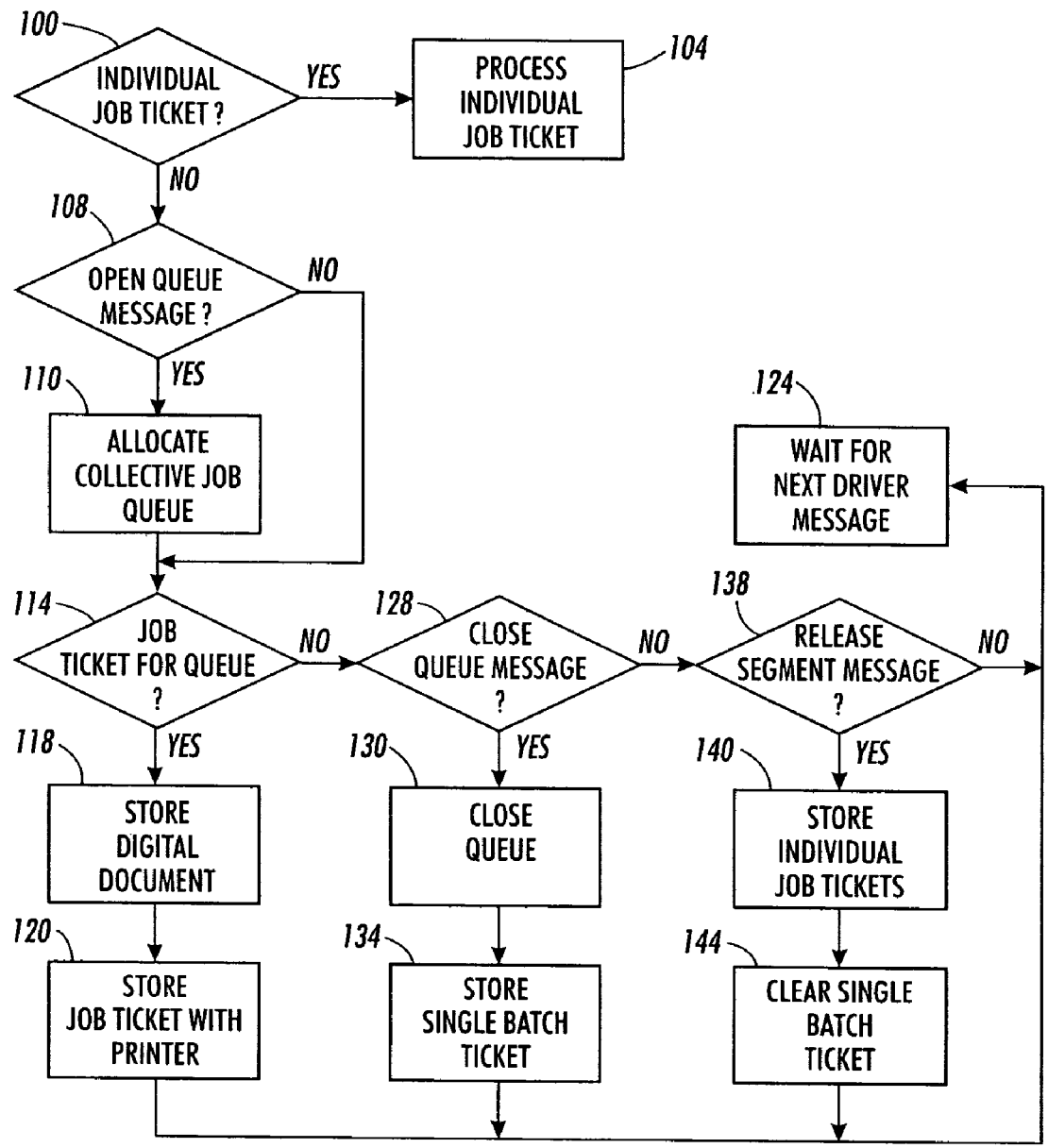
FIG. 5 is a flow diagram of an example of a program implementing the collective job queue manager of the present invention.

An exemplary method that may be implemented in a collective job queue program is shown in FIG. 5. The method includes determining whether a message received from a print driver is an individual job ticket (block 100). If it is, it is processed in a known manner for individual job tickets (block 104). Otherwise, the method determines the message is an open collective job queue message (block 108). If it is, storage space is allocated for a collective job queue and the queue is associated with the requesting network device (block 110). Otherwise, the method determines whether the message is a job ticket for an open collective job queue (block 114). If it is, the associated digital document is stored in the document storage (block 118) and the job ticket with the pointer to the associated document is stored in the corresponding open collective job queue (block 120). The process continues by waiting for the next message from a print driver (block 124). If the method determines the message is not a job ticket for an open queue, an individual job ticket, or an open collective queue message, it determines whether it is a close queue message (block 128). If it is, it closes the queue (block 130). It also generates and stores a single batch job ticket in the print job scheduling table (block 134) before returning to wait for the next print driver message (block 124). If the method determines the message is not a job ticket for an open queue, an individual job ticket, an open collective queue message, or a close queue message, it determines whether it is a release job segment message (block 138). If it is, it stores the individual job tickets in the print job scheduling table (block 140) and clears the single batch job ticket from the scheduling table (block 144) before waiting for the next message from a print driver (block 124).

Figure 6:
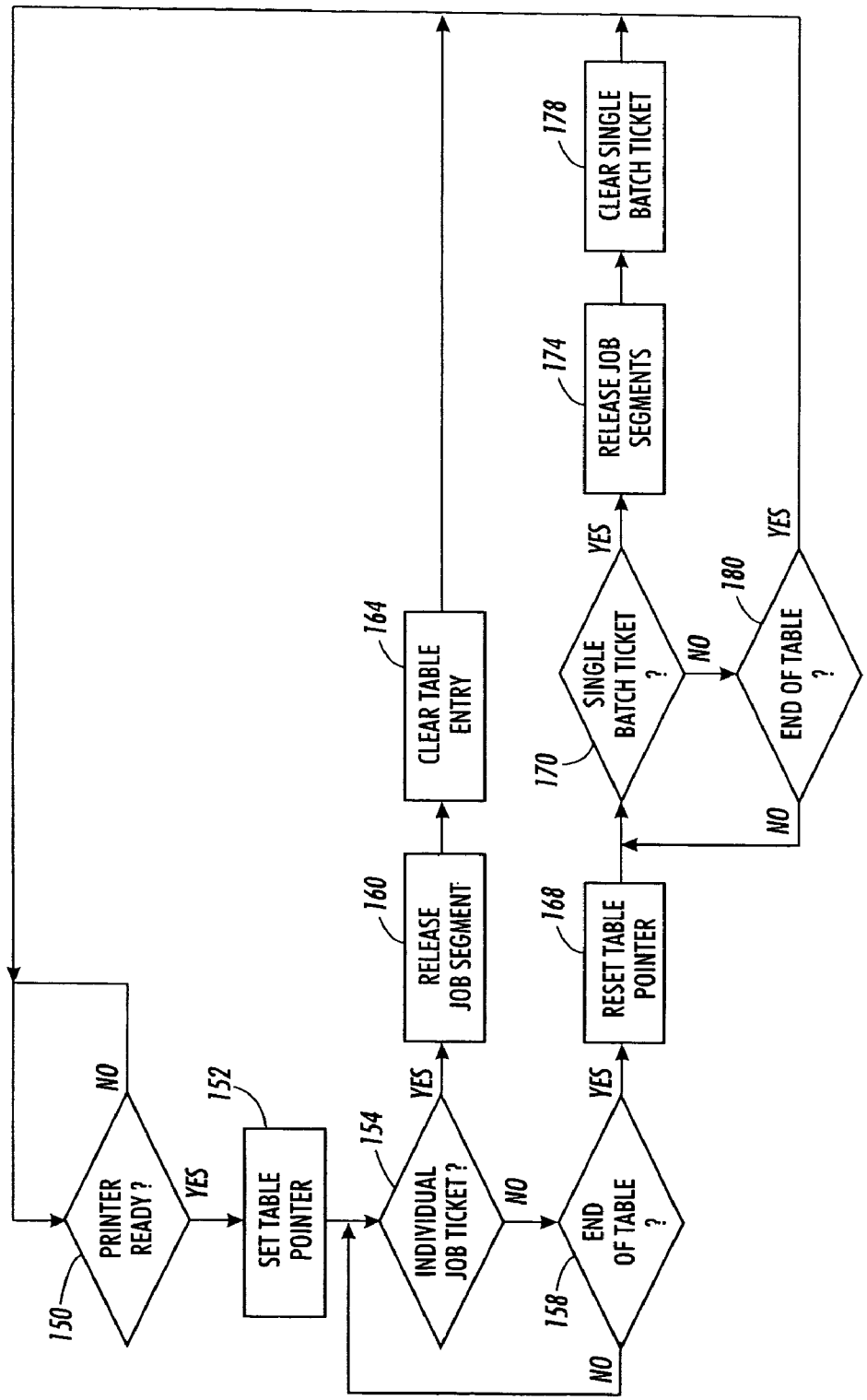
FIG. 6 is a flow diagram of an example of a program implementing the print job scheduler of the present invention.

One example of a program for scheduling the release of job tickets and corresponding digital documents to the printer 20 is shown in FIG. 6. The process determines whether the printer is ready for the release of a job ticket (block 150). If it is not ready, the process continues looping until the printer is ready. When the printer is ready for a job segment, the process sets the scheduling table pointer to the beginning (block 152) and scans the scheduling table for an individual job ticket until encounters one (block 154) or reaches the end of the table (block 158). If an individual job ticket is encountered, the job ticket and associated digital document is released to the print engine of the printer 20 (block 160) and the individual job ticket is removed from the scheduling table (block 164). If the end of the table is reached without encountering an individual job ticket, the table pointer is reset to the table beginning (block 168) and the table is scanned for a single batch job ticket (block 170). If one is encountered before the end of the table is reached, the job segments for the single batch print job are released to the print engine (block 174) and the single batch job ticket is removed from the scheduling table (block 178). If the end of the table is reached without encountering the end of the scheduling table (block 180), the process continues looking for job tickets in response to the printer being ready for printing.

Figure 7:
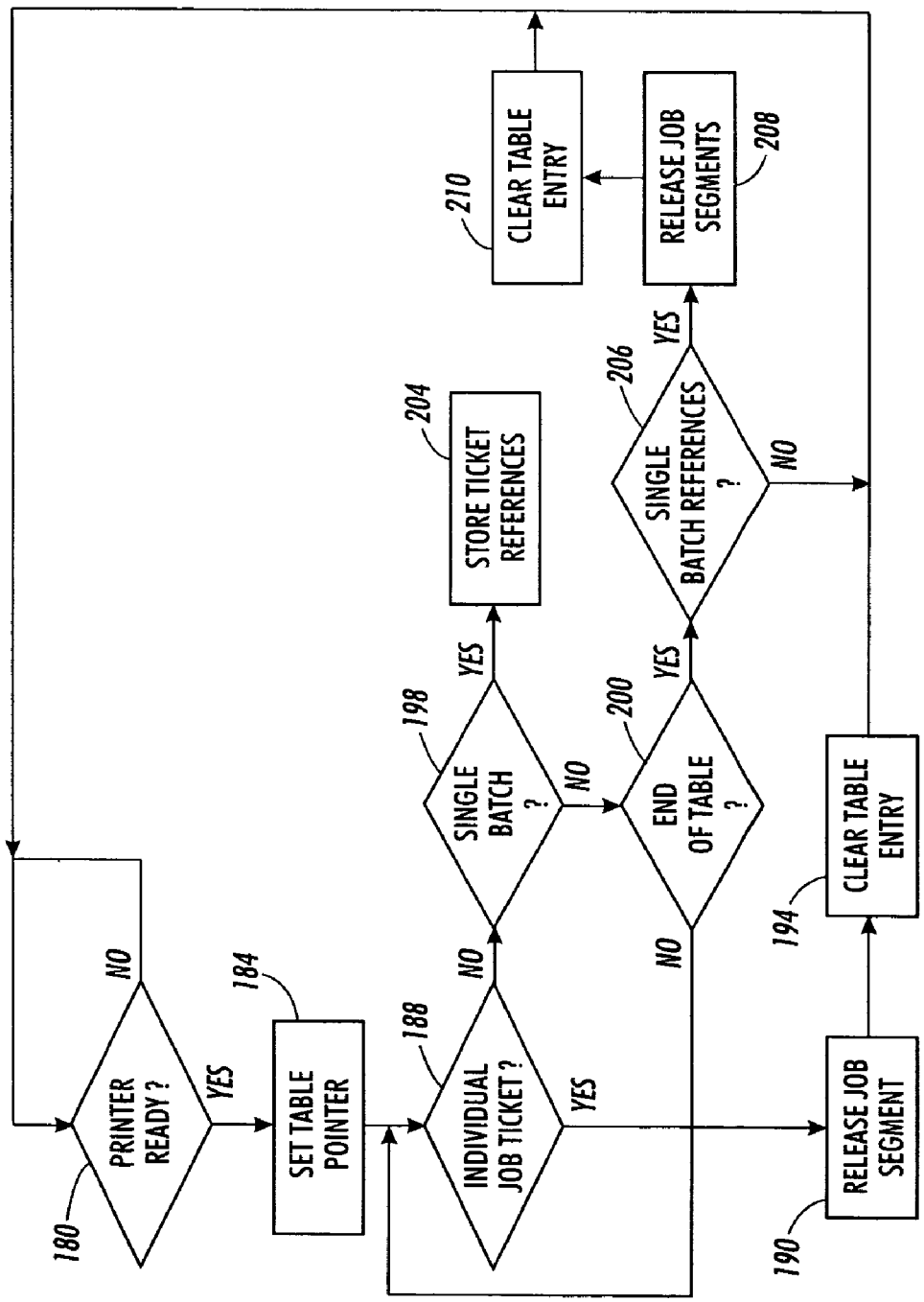
FIG. 7 is a flow diagram of an example of a program implementing the print job scheduler of the present invention.

The example of FIG. 6, gives individual job tickets a higher priority over single batch tickets and releases the first encountered single batch ticket if no individual batch tickets are encountered. In FIG. 7, another example of a print job scheduler is shown that schedules single batch print jobs on a basis other than the first one stored in the scheduling table. That process begins by determining when the printer is ready for a job segment (block 180) and setting the scheduling table pointer to the beginning when the printer is ready (block 184). If an individual job ticket is encountered (block 188), the job ticket and digital document are released to the print engine (block 190) and the individual job ticket is cleared from the table (block 194). If a single batch ticket is encountered (block 198) before the end of the table is reached (block 200), a reference to the single batch ticket is stored (block 204). If the end of the table is encountered before an individual job ticket is released (block 200), the process determines whether any single batch job tickets were encountered (block 206). If no single batch tickets were encountered, the process is repeated until a job ticket of some type is encountered and released. If single batch tickets were encountered, one of the single batch tickets is selected (block 206) and the job ticket and digital document of the selected single batch ticket are released to the printer (block 208) before the process begins again.

In one embodiment of the present system, time or size parameters may be evaluated in the single batch job release determination. For example, the print job scheduler may store a time in table value with a single batch ticket. Individual job tickets received after the time in table value reaches a maximum time threshold may have a lower priority than the single batch job ticket and the processing of FIG. 7 may be adjusted to accommodate this processing. This modification helps ensure that a substantially continual receipt of individual job tickets does not indefinitely postpone the timely printing of a collective job queue. Another type of single batch ticket releases may include the evaluation of size parameters. That is, the print job scheduler may permit only individual job tickets for print jobs smaller than a pending single batch ticket to be processed ahead of the single batch ticket. Likewise, the single batch tickets may be released according to their relative size. This method helps prevent delay in processing a single batch job because an individual ticket for a large single digital document acquires the printer resource. Of course, these two methods may be combined so that the print job scheduler evaluates the time of job tickets to the time of closure for a collective job queue as well as comparing the size of individual job tickets to the size associated with a pending collective job queue.

The system of the present invention may generate and build multiple collective job queues. This occurs when more than one network device uses its print driver 34 to cause the collective job queue manager 54 to generate and build a collective job queue for the requesting network device. The print job scheduler 58 may determine the order of releasing a pending single batch job is based on the time of closing the queue so that a single batch ticket for a first closed collective job queue is released before a single batch ticket for a second closed collective job queue is released. In another embodiment, the print job scheduler 58 may release a single batch ticket for a smaller collective job queue before releasing a single batch ticket for a larger collective job queue regardless of the time of closing for the two collective job queues.

In another embodiment, the print job scheduler 58 may evaluate both size and time of closing in a variable weighting scheme. In this embodiment, size may be given more weight in the evaluation of a single ticket release until a pending single ticket has been pending for some maximum time period in the table. Thereafter, the time spent in the scheduling table may be given more weight in the release scheduling. Of course, scheduling of the multiple collective job queues may occur in conjunction with the release of individual job tickets in a manner similar to that discussed above.

According to one aspect of the present invention, a user may intervene in the release scheduling for a single batch job ticket by releasing a job segment associated with a single batch job ticket. Once a job segment has been released from a single batch ticket, all of the job tickets are released so that the job tickets of the collective job queue become individual job tickets. In response to the release of the job tickets from the collective job queue, the print job scheduler 58 may generate table entries for the individual job tickets and remove the single batch job ticket from the scheduling table as noted above with respect to FIG. 5. In this manner, a user may decide to accept the task of sorting through output at a printer in lieu of waiting for a continuous output stream of digital documents for the user at the shared printer.

To reduce the likelihood that a user is able to monopolize a shared printer by generating multiple collective job queues for printing on the shared resource, the print job scheduler of the present invention may also prioritize the single batch tickets for the same user. This may be accomplished, for example, by having the scheduler assigned a priority to each single batch job ticket that corresponds to the same user. This assigned priority may be used to allow only one of the user's single batch print jobs to be selected from the scheduling table before the single batch job tickets for other users are selected. Only after the single batch job tickets for other users are selected and released to the print engine are the other single batch job tickets assigned new priorities that enable them to be processed with other single batch tickets.

In another aspect of the present invention, the print engine may also be modified so that it generates a banner page for a job segment being printed. If the next job segment corresponds to the same user, the job segment is printed without the generation of another banner page. This type of contiguous job segment printing continues until a job segment corresponding to a different user is encountered. In this manner, only one banner page is generated and printed for a plurality of job segments corresponding to a single batch job ticket.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A method for contiguously printing digital documents for a single user at a shared printer comprising:

opening a collective job queue in response to an open collective job queue message received from a network device, and associating the opened collective job queue with the network device from which the open collective job queue message was received;

directing a plurality of print job segments received from the network device that requested a collective job queue to be opened to the collective job queue associated with the network device;

generating and storing a single batch ticket for an opened collective job queue in a print job scheduling table for a printer in response to a close collective job queue message being received from the network device that requested the collective job queue to be opened; and releasing the print job segments of the collective job queue identified by a single batch ticket to a print engine for printing as a single job in response to the single batch job ticket being selected from the print job scheduling table.

2. The method of claim 1, further comprising:

selecting a single batch job ticket in accordance with a size parameter; and releasing the job segments associated with the selected single batch job ticket to the print engine for printing.

3. The method of claim 1, further comprising:

selecting a single batch job ticket in accordance with a time in table value parameter; and releasing the job segments associated with the selected single batch job ticket to the print engine for printing.

4. The method of claim 1, further comprising:

generating and printing a single banner page for the plurality of print job segments released and printed by the print engine.

5. The method of claim 1, further comprising:

generating individual job tickets for the job segments stored in a collective job queue associated with a network device that previously requested the collective job queue to be opened in response to a message to release a print job segment message received from the network device that previously requested the collective job queue to be opened; and storing the generated individual job tickets in the print job scheduling table.

6. A system for contiguously printing digital documents for a single user at a shared printer comprising:

a plurality of network devices coupled to a network, each network device having a print driver configured to request a collective job queue and to generate job tickets for the collective job queue; and a print job manager configured to generate a collective job queue for each network device that sends a message to the print job manager to open a collective job queue, and the print job manager being configured to release to a print engine job segments corresponding to the job tickets stored in one of the collective job queues opened by the print job manager, the job segments being released in response to the print job manager receiving a close collective job queue message from the network device associated with the opened collective job queue to enable the job segments to be contiguously printed by the print engine.

7. The system of claim 6, wherein the print job manager generates a single batch job ticket corresponding to the job tickets stored in a collective job queue and stores the single batch job ticket in a print job scheduling table in response to the message to close the collective job queue associated with the network device that sent the message; and the print job manager further comprises a print job scheduler for selecting single batch tickets from the print job scheduling table for release to a print engine to enable the job segments corresponding to the selected single batch ticket to be contiguously printed.

8. The system of claim 6, wherein the print job scheduler selects a single batch job ticket according to its order in the print job scheduling table.

9. The system of claim 6, wherein the print job scheduler selects a single batch job ticket according to the size of the job segments comprising the single batch job ticket.

10. The system of claim 6, wherein the print job scheduler selects a single batch job ticket according to the time that the single batch job ticket has been in the print job scheduling table.

11. The system of claim 6, further comprising:

a print engine for generating and printing one banner page for the plurality of job segments corresponding to a single batch job ticket.

12. The system of claim 7, wherein the print job manager generates and stores individual job tickets in the print job scheduling table that correspond to a single batch ticket in response to a release job segment message being received from the network device associated with the collective job queue.

13. A system for contiguously printing digital documents for a single user at a shared printer comprising:

a print job manager for communicating with a print driver; and a collective job queue manager in communication with the print job manager, the collective job queue manager for generating and associating a collective job queue with a network device in response to the print job manager receiving a request from the network device to open a collective job queue from a print driver executing on the network device.

14. The system of claim 13, wherein the collective job queue manager generates a single batch job ticket corresponding to the job tickets stored in a collective job queue and stores the single batch job ticket in a print job scheduling table in response to the print job manager receiving a request to close the collective job queue associated with a network device; and the system further comprises a print job scheduler for selecting single batch tickets from the print job scheduling table for release to a print engine to enable a job segment corresponding to the selected single batch ticket to be released for contiguous printing.

15. The system of claim 14, wherein the collective job queue manager generates individual job tickets for storing in the print job scheduling table that correspond to a single batch ticket in response to the print job manager receiving a release job segment message from a print driver executing on a network device.

16. The system of claim 15, further comprising:

a print engine for generating and printing one banner page for the plurality of job segments corresponding to a single batch job ticket.

17. The system of claim 15, wherein the print job scheduler selects a single batch job ticket according to a size of the job segments corresponding to the single batch job ticket.

* * * * *